(12) United States Patent
Appleby

(10) Patent No.: US 9,406,073 B2
(45) Date of Patent: Aug. 2, 2016

(54) SYSTEM AND METHOD FOR FACILITATING THE EXCHANGE OF USER TRAFFIC BETWEEN WEB SITES

(71) Applicant: Evan Appleby, Brooklyn, NY (US)

(72) Inventor: Evan Appleby, Brooklyn, NY (US)

( * ) Notice: Subject to any disclaimer, the term of this patent is extended or adjusted under 35 U.S.C. 154(b) by 146 days.

(21) Appl. No.: 14/311,319

(22) Filed: Jun. 22, 2014

(65) Prior Publication Data

US 2015/0372891 A1    Dec. 24, 2015

(51) Int. Cl.
| | |
|---|---|
| *G06F 15/173* | (2006.01) |
| *G06Q 30/02* | (2012.01) |
| *G06Q 30/04* | (2012.01) |
| *G06Q 30/08* | (2012.01) |
| *G06F 17/30* | (2006.01) |

(52) U.S. Cl.
CPC .............. *G06Q 30/02* (2013.01); *G06Q 30/04* (2013.01); *G06Q 30/08* (2013.01); *G06F 17/3089* (2013.01); *G06F 17/30882* (2013.01)

(58) Field of Classification Search
None
See application file for complete search history.

(56) References Cited

U.S. PATENT DOCUMENTS

| | | | | | |
|---|---|---|---|---|---|
| 5,995,099 | A * | 11/1999 | Horstmann | ....... | G06F 17/30882 707/E17.013 |
| 7,082,470 | B1 * | 7/2006 | Lesser | ................ | G06F 17/3089 707/999.01 |
| 7,912,960 | B2 * | 3/2011 | Bansod | ................ | H04L 63/061 370/232 |
| 2002/0004825 | A1 * | 1/2002 | Lindberg | ................ | H04L 29/06 709/218 |
| 2002/0128959 | A1 * | 9/2002 | Kostic | .................... | G06Q 40/04 705/37 |
| 2003/0195837 | A1 * | 10/2003 | Kostic | ................... | G06Q 40/04 705/37 |
| 2011/0078550 | A1 * | 3/2011 | Nabutovsky | ...... | G06F 17/30887 715/206 |
| 2011/0191231 | A1 * | 8/2011 | Zuver, Jr. | ............... | G06Q 40/04 705/37 |

\* cited by examiner

*Primary Examiner* — Wing F Chan
*Assistant Examiner* — Padma Mundur

(57) ABSTRACT

System and methods for facilitating link exchange partnerships between Webmasters in which an approximately equal and optimal amount of user traffic is sent between the web sites. Specifically, the method of creating a link exchange partnership and fulfilling of its obligations includes providing a Webmaster the opportunity to propose link exchange partnerships with other Webmasters, giving the Webmaster on the receiving end of the link exchange partnership proposal the opportunity to accept or decline the request, determining the maximum amount of user traffic that two Webmasters can agree to send to each other while still accounting for each of the Webmasters other link exchange partnerships, and displaying Partner Widgets on both Webmasters' web sites that display links to the other web site's content to a determined percentage of each web site's users with the intention that the displaying of the links will result in an approximately equal and optimal amount of user traffic directed from one web site to the other web site.

14 Claims, 12 Drawing Sheets

FIG. 11
from our friends
refinery29
Kylie Minogue Teams Up
With Uslu Airlines To Make
A Pretty
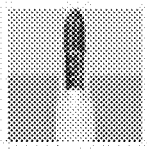
who what wear
9 Secrets To Making Your
Outfit Look Expensive
nylon
best dressed: alexa chung
SIGN UP
ONDA
harper's bazaar
Back to Basics: 12 Shoes
Every Woman Should Own
fashionista
Scarlett Johansson Goes
Barefaced, Cara Delevingne
and
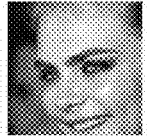
powered by PubExchange

SYSTEM AND METHOD FOR FACILITATING THE EXCHANGE OF USER TRAFFIC BETWEEN WEB SITES

CROSS-REFERENCE TO RELATED APPLICATIONS

This application is related to and claims priority to U.S. Provisional Patent Application No. 61/859,851 filed on Aug. 2, 2013, titled SYSTEM AND METHOD FOR FACILITATING THE EXCHANGE OF USER TRAFFIC BETWEEN WEB SITES, the entire disclosure of which is incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

TECHNICAL FIELD

The present invention relates to Internet user traffic and more specifically, to a system and method for directing user traffic from one web site to another web site.

BACKGROUND OF THE INVENTION

When owners or managers of web sites ("Webmasters") want to increase user traffic to their web sites, a common strategy is to approach other Webmasters and propose a link exchange.

A link exchange is when two Webmasters mutually agree to include links to each other's web sites on their own web sites. Typically, these links are displayed within a dedicated section on each of the Webmasters' web sites (a "Partner Widget"). Users often utilize these links to navigate to other web sites, thus increasing user traffic. When two Webmasters agree to a link exchange, the expectation is that an approximately equal amount of user traffic will be directed to each web site from the other web site. In order to ensure equal amounts of user traffic are exchanged, many Webmasters that engage in link exchanges, particularly those at web sites that receive relatively large amounts of user traffic, agree on specific amounts of user traffic that they will send to and receive from each of their link exchange partners ("User Traffic Targets"). Once User Traffic Targets are agreed upon, the Webmasters display links to the other web sites in their Partner Widgets and track the amount of user traffic that they send to each of their link exchange partners by utilizing analytics tools (such as Google Analytics). When a User Traffic Target has been met or exceeded, the Webmaster removes the links to their link exchange partner's web site and replaces them with links to another one of their link exchange partners' web sites.

If a Webmaster's web site does not receive a steady flow of user traffic, it can be difficult to accurately predict an amount of user traffic that they may be able to direct to another web site. As a result, these Webmasters may agree to display links to their link exchange partner's web sites without agreeing on User Traffic Targets and hope that the link exchange partnerships are equitable.

Even for Webmasters that can mutually agree on User Traffic Targets, it can be very time consuming to manage multiple link exchange partnerships that are occurring in parallel because each new partnership likely requires the technical task of updating their web sites. Furthermore, in the event that there are fluctuations in user traffic to a Webmaster's web site, the Webmaster may need to make modifications to User Traffic Targets, which requires contacting the other Webmaster and coming to a new agreement.

Whether or not User Traffic Targets are agreed upon, since there is not an independent, governing body that tracks the user traffic that is sent between web sites, Webmasters may not know whether their link exchange partners are using the same tools and methods to record user traffic.

Accordingly, there is a need for improved methods and systems for managing link exchanges that remedies the shortcomings of the prior art.

BRIEF DESCRIPTION OF THE DRAWINGS

FIGS. 11-12 depict examples of Partner Widgets.

DETAILED DESCRIPTION OF THE INVENTION

Figure 1:
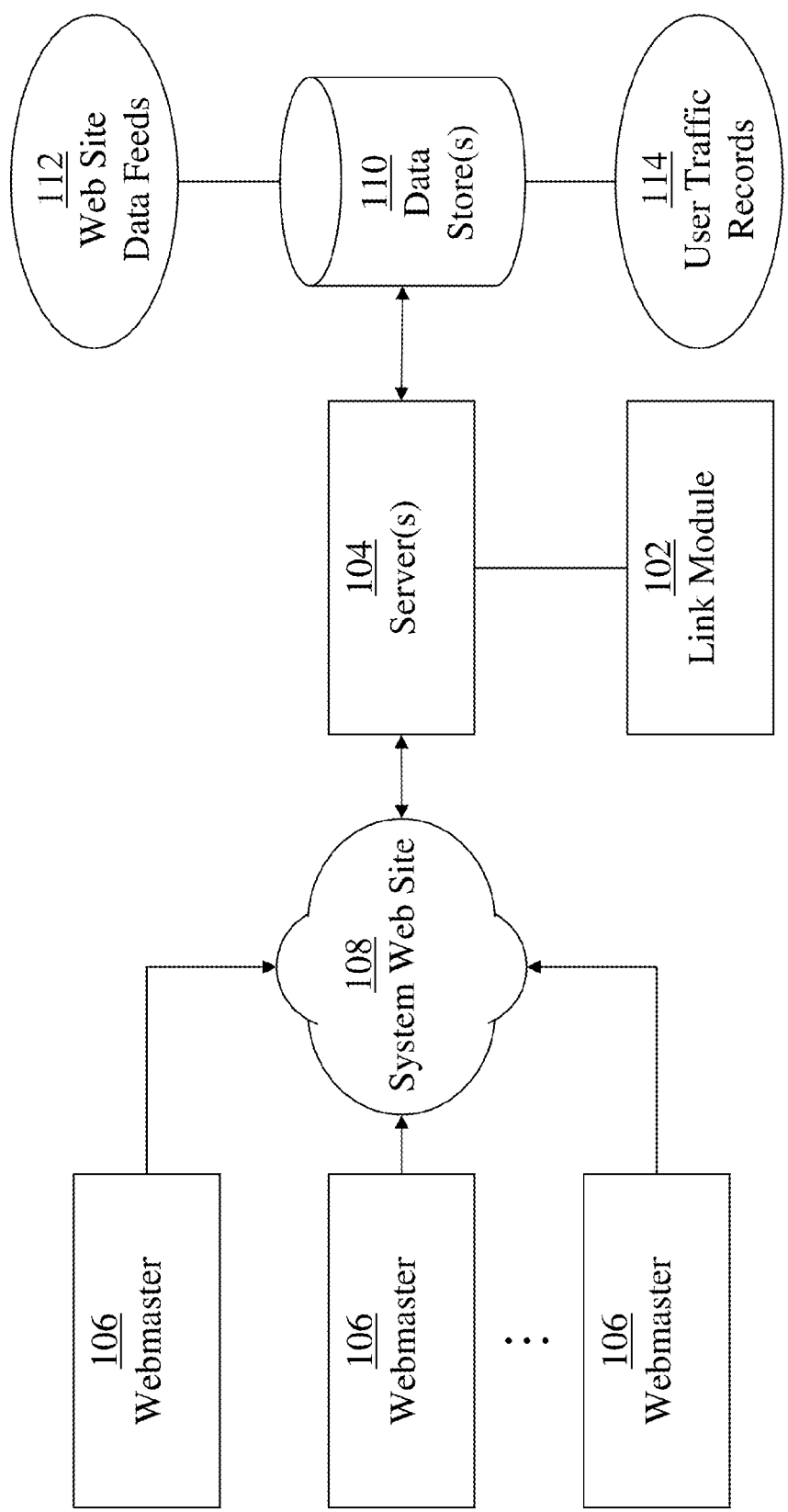
FIG. 1 is a block diagram depicting example system architecture of a link exchange management system according to an embodiment of the present invention.

FIG. 1 depicts a link exchange management system for managing the trading of user traffic among a community of participating web sites according to an embodiment of the present invention. The link module 102 provides a platform for displaying links within Partner Widgets that are displayed on both a first web site and a second web site. The first web site displays links that direct a user to the second web site in exchange for the second web site displaying links that direct a user to the first web site. The link module 102 ensures that the first web site and the second web site direct an approximately equal amount of user traffic to each other over the course of the link exchange partnership through users clicking on the links within the Partner Widgets placed on the web sites.

The link module 102 may provide a platform for Webmasters to widely distribute links that direct user traffic back to their web site. In order to have their links displayed in Partner Widgets on other web sites, the Webmaster first uses the system web site 108 to establish link exchange partnerships with other Webmasters. The link module 102 then determines User Traffic Targets and regularly adjusts the User Traffic Targets without the Webmasters needing to intervene or provide input.

However, Webmasters may be able to increase the User Traffic Targets by increasing the rate at which the links within the Partner Widget on their web site are clicked on. For example, Webmasters can allocate a more prominent placement on their web site for the Partner Widget, adding multiple Partner Widgets to their web site, and selecting the content from their link exchange partner's web sites that are of the most interest to the users of the Webmaster's web site. By increasing the rate at which the links within the Partner Widget on the Webmaster's web site are clicked on, the Webmaster is able to increase the overall user traffic that they direct to their link exchange partners' web sites, which subsequently increases the User Traffic Targets and results in more user traffic being directed back to the Webmaster's web site.

A Link Impression is a single instance when a link is displayed in a Partner Widget (i.e., if a Partner Widget contains five (5) links, then five (5) Link Impressions will be generated for each time that Partner Widget is served).

If a web site's link exchange partners are unable to reciprocate the total user traffic that the web site can send them, then the link module 102 will either show links to the web site's own content within the web site's Partner Widget or show no links at all for the portion of Link Impressions that are not allocated to the web site's link exchange partners. The web site's Webmaster can designate whether the link module 102 will show links to the web site's own content or no links at all within the dashboard of the system web site 108.

The link module 102 provides systems and methods for Webmasters to trade user traffic with other Webmasters. The link module 102 may be provided using one or more servers 104. One or more Webmasters 106 interact with the link module 102 via the system web site 108 which is conveyed via networks (e.g., local area network, wide area network, interne, combinations thereof, etc.), fiber optic medium, carrier waves, wireless networks, etc. The link module 102 may be responsive to one or more data stores 110. The one or more data stores 110 may contain a variety of data associated with the link module 102, such as web site data feeds 112 and user traffic records 114 relating to the Partner Widgets that are displayed on the Webmasters' web sites.

The data store 110 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A "set", as used herein, refers to any positive whole number of items.

Figure 2:
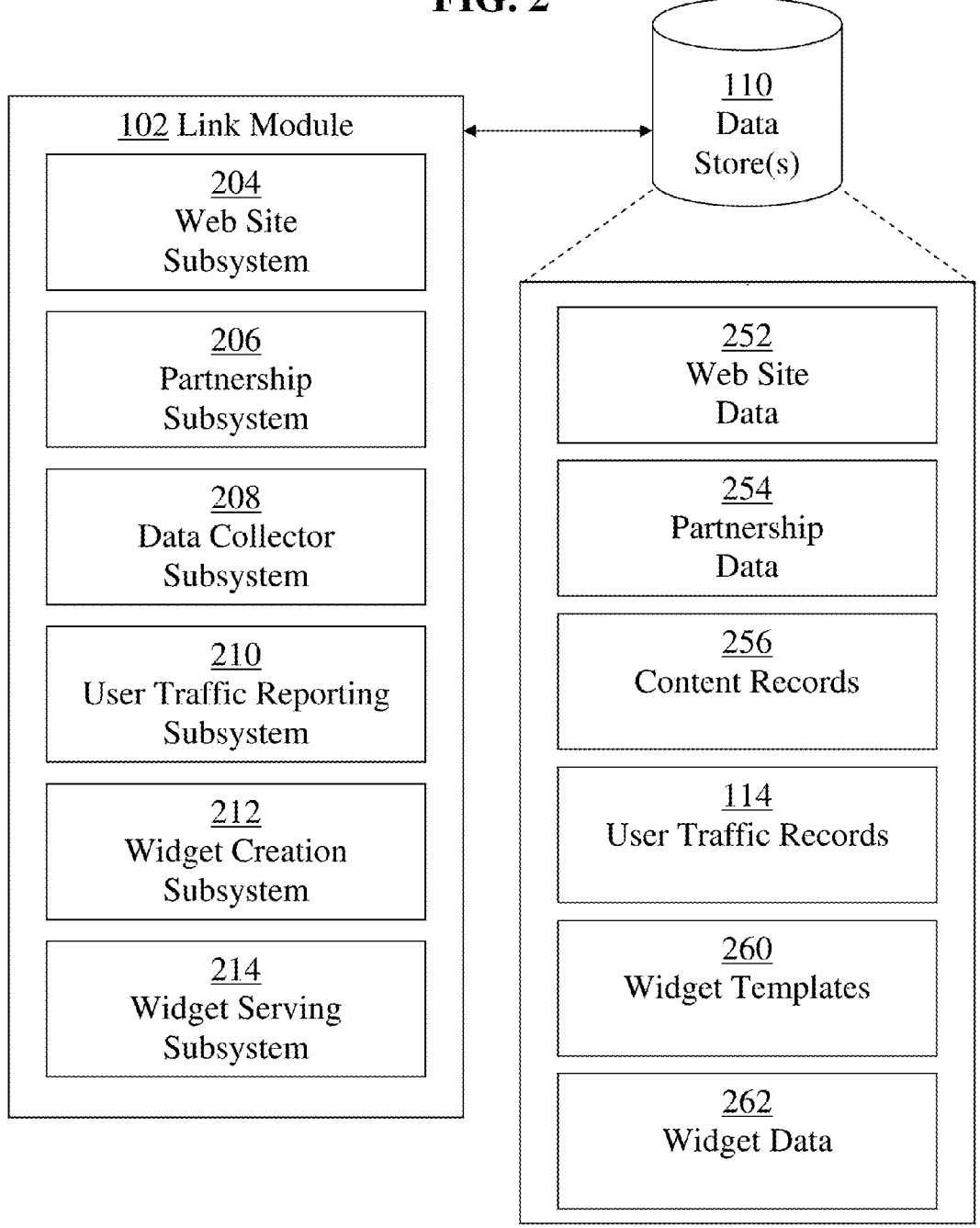
FIG. 2 is a block diagram depicting example subsystem architecture of a link module according to an embodiment of the present invention.

FIG. 2 is a block diagram of one implementation of the link module 102 according to an embodiment of the present invention. In an embodiment, the link module 102 includes a web site subsystem 204, partnership subsystem 206, a data collector subsystem 208, a user traffic reporting subsystem 210, a widget creation subsystem 212, and a widget serving subsystem 214. In alternative implementations, one or more of these subsystems may be combined into a single subsystem. Additionally, the functionality of any of these subsystem may be separated into multiple distinct subsystems.

The web site subsystem 204 can receive input of web site data 252 from web sites participating in the platform. The web site data 252 can be stored in a data store 110 that is coupled to the web site subsystem 204. The web site data 252 can include, for example, and not limited to, one or more web site identifiers (e.g., uniform resource locators (URLs)), one or more Partner Widget identifiers (e.g., universally unique identifiers (UUIDs)), logos and trademarks associated with the web site, descriptions of the web site, etc. The web site subsystem 204 can store web site data 252 for any number of web sites.

The partnership subsystem 206 can receive input of partnership data 254 from a Webmaster's link exchange partners as well as certain data that is associated with the link exchange partners' web sites stored in the associated web site data 252. The partnership data 254 can be stored in a data store 110 that is coupled to the partnership subsystem 206. The partnership data 254 can include, for example, and not limited to, one or more feed identifiers (e.g., URLs), one or more Webmaster specified content record identifiers (e.g., URLs), a Webmaster specified User Traffic Target, etc. The partnership subsystem 206 can store partnership data 254 for any number of web sites with which the Webmaster has established link exchange partnerships.

A web site data feed 112 can contain any number of items. An "item" or "feed item" refers to an individual entry within the feed and may represent a text-based article, an image, a video or any other content supported by the particular feed. An item in a data feed can include a number of elements. Examples of elements of a data feed item can include, and are not limited to, a title element, a link element describing a location (e.g., URL) of the data feed item, a description element, a body text element, URL, a keywords element, a media (e.g., image, audio, video) file element, a publish date element, an author element, a category element, a comments element, an identifier element, a source element, etc.

The data collector subsystem 208 can establish communication with any number of feed servers, as designated in the partnership data 254, to receive the web site data feeds 112. For example, the data collector subsystem 208 can subscribe to the web site data feed 112. The data collector 208 can include a feed aggregator to receive the feeds from any number of feed servers. The data collector subsystem 208 can collect data for the elements for each item in the data feed and can generate a content record 256 for each item. The content record 256 can include the data for the elements (e.g., title, link, description, etc.). Any number of content records 256 for any number of items in any number of web site data feeds 112 can be stored in the data store 110. Examples of a content record 256 can include, and are not limited to, a record in a file system, a record in a database, a text file, a database entry, etc.

If a particular data element (e.g., thumbnail image) is not included in a web site data feed 112, the data collector subsystem 208 can collect data for the particular data element from the source (e.g., web page) of the content that is associated with the item. The data collector subsystem 208 can retrieve data for an element from a source using a web crawler or web spider capable of scraping content from, for example, a URL. One implementation of collecting data for the Partner Widget using the web site data feed 112 is described in greater detail below in conjunction with FIG. 4.

The user traffic reporting subsystem 210 provides data to Webmasters so that they can view the user traffic that has been directed to and from the Webmaster's web site. The data may be aggregated by date, content source, link exchange partner, etc. The data may be used by Webmasters to determine the effectiveness of a link exchange partnership. One or more user traffic records 114 may be provided to a Webmaster based on monitored performance. For example, a click through rate can be examined for links that direct users to a particular web site. If the click through rate is lower than desired, then the Webmaster can choose to select the specific content from that web site to display in their Partner Widget or choose to end the link exchange partnership.

The widget creation subsystem 212 can create one or more widget templates 260 for each Webmaster using the widget data 262 as well as the web site data 252 and the partnership data 254 and store the templates 260 in the data store 110. The widget data 262 can be stored in a data store 110 that is coupled with the web site data 252 and the partnership data 254 to the widget creation subsystem 212. The widget data 262 can include, for example, and not limited to, web site specific styling customizations of a widget template 260, the content mix within a widget template 260 (e.g., display all content in widget template from a single link exchange partner or display content from multiple link exchange partners), the number of links to include in a widget template 260, etc. A Webmaster may be able to input the widget data 262 for the widget templates 260 that are used to display the Partner Widgets on the Webmaster's web site by navigating to the dashboard on the system web site 108 and inputting the data. If a Webmaster does not input the widget data 262, then the widget template 260 uses default widget data 262 as determined by the link module 102.

The widget template 260 may also indicate which one or more data elements in a content record 256 should be used to populate the Partner Widget. For example, a Partner Widget for Webmaster A's web site may include a link (e.g., URL) element and a title element. In another example, a Partner Widget for Webmaster B's web site may include a link element and the media (e.g., image) element. In other implementations, a Partner Widget includes any combination of the data elements in one or more content records 256.

The widget serving subsystem 214 can receive a request to create a Partner Widget and can determine which Partner Widget to generate for the request. The request can be received from a browser or a mobile application on a user device. The widget serving subsystem 214 can use data in the request to identify which widget template 260 to generate to populate the Partner Widget. For example, the data in the request may indicate that the request is for a web site A and for a Partner Widget with unique identifier "XYZ" for web site A. Based on this data, the widget serving subsystem 214 may identify that a particular widget template 260 which is for web site A and a Partner Widget with unique identifier "XYZ" should be used to create the Partner Widget.

Figure 3:
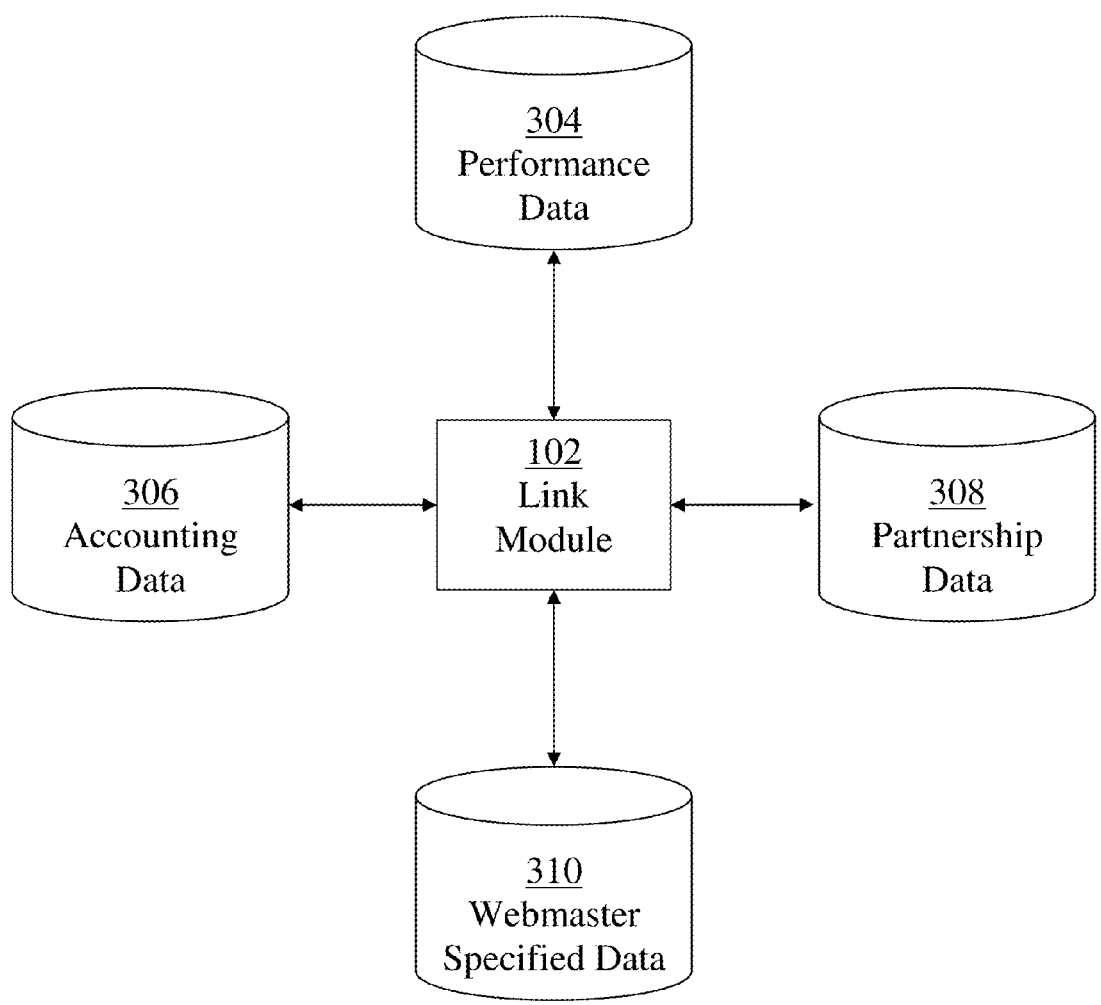
FIG. 3 is a block diagram depicting example data that may be monitored and maintained by a link module.

FIG. 3 is a block diagram depicting example data that may be monitored and maintained by the link module 102. In an embodiment, the link module 102 monitors and maintains performance data 304, accounting data 306, partnership data 308, and Webmaster specified data 310. Such data may be stored on one or more computer-readable storage mediums.

The link module 102 may track a variety of performance data 304 related to web sites participating in the link exchange management system. For example, performance data 304 may include the number of times links to a web site have been displayed in a Partner Widget (Impressions), the number of times that a user has clicked on a link from within a Partner Widget to a web site (Clicks), and the rate of Clicks per Impressions (CTR).

The link module 102 may use the performance data in a variety of ways. Performance data 304 may be used for estimating the total amount of Link Impressions that a web site will be able to generate over a given time period (Total Estimated Link Impressions).

The link module 102 also tracks accounting data 306 related to a web site's link exchange partnerships. The accounting data 306 may include the number of web sites with which a web site has established link exchange partnerships. Accounting data may be used to determine the percentage of a web site's Total Estimated Link Impressions to allocate to links to the content of a single link exchange partner. For example, if the link module 102 has determined that web site A will have one thousand (1,000) Total Estimated Link Impressions over a one (1) day period and according to the accounting data 306, the link module 102 has determined that web site A has two (2) link exchange partners, then the link module 102 allocates five hundred (500) Link Impressions for links to each of web site A's two (2) partners.

In an embodiment, the link module 102 tries to allocate Link Impressions evenly between the link exchange partners that have not already had their Link Impression allocation set. For example, if web site A has four (4) link exchange partners, web sites B, C, D and E, and one thousand (1,000) Total Estimated Link Impressions to allocate, then the link module 102 allocates two hundred fifty (250) Link Impressions to each of the partners. However, if based on the partnership data 308, the link module 102 determines that it can only allocate one hundred (100) Link Impressions to web site B, then the link module 102 allocates the remaining nine hundred (900) Link Impressions evenly to the other partners with three hundred (300) Link Impressions to each of web sites C, D and E.

To determine if a link exchange partner can allocate the Link Impressions needed to fulfill a User Traffic Target that the link module 102 is trying to allocate to a link exchange partnership, the link module 102 tracks partnership data 308 related to a web site's link exchange partners. The partnership data 308 may include the Link Impressions that each link exchange partner has to allocate to each of its partners as well as the CTRs of links that direct user traffic back to a web site from each of its link exchange partners' web sites.

For example, if the link module 102 determines that it can allocate five hundred (500) Link Impressions to web site B and the CTR for links from web site A to web site B is one percent (1%), then the link module 102 will try to set the User Traffic Target for the link exchange partnership between web site A and web site B to five (5) Clicks. If according to the partnership data 308, the CTR for links from web site B to web site A is two percent (2%), then web site B would need to allocate two hundred fifty (250) Link Impressions to reciprocate the User Traffic Target. However, if according to the partnership data 308, web site B will only have two hundred (200) Link Impressions to allocate to web site A, then that would reduce the User Traffic Target to four (4) Clicks and therefore web site A will only need to allocate four hundred (400) Link Impressions to links that drive user traffic to web site B to fulfill the User Traffic Target.

To ensure that all the link exchange partnerships between web sites in the link exchange management system have User Traffic Targets set to the equal and optimal amount that each web site can fulfill, the link module 102 first determines the User Traffic Target for the partnership between web site A that has the least Link Impressions that it can allocate to each of its partners of all web sites in the link exchange management, and web site B that has the least Link Impressions that it can allocate to each of its partners of all web sites with which web site A has partnered (Least Link Impression Allocations). The link module 102 then determines the User Traffic Target for the partnership with the Least Link Impression Allocations that does not yet have the User Traffic Target set and continues determining the User Traffic Target for the partnerships with the Least Link Impression Allocations until all partnerships have their User Traffic Targets set. The link module 102 will iteratively update all the User Traffic Targets so that as user traffic is sent between the web sites, the User Traffic Targets will continually be the equal and optimal amounts.

The link module 102 may also use the partnership data 308 to make adjustments to Link Impression allocations when a first web site has sent substantially more user traffic to a second web site than the second web site has sent to the first web site. For example, if links within a Partner Widget on web site A that direct users to web site B have been clicked on five hundred (500) times over the course of the link exchange partnership between web site A and web site B, but the links within a Partner Widget on web site B that direct users to web site A have only been clicked on three hundred (300) times over the same time period, then the link module 102 recognizes that the links on web site A have been clicked on two hundred (200) more times than the links on web site B and the link module 102 adjusts the Link Impressions allocation to web site A to account for this disparity. In one implementation, the link module 102 may reduce the amount of Link Impressions web site A allocates to web site B until web site B has reciprocated the user traffic.

The link module 102 also tracks Webmaster specified data 310 which stores information that a Webmaster has set to override the link module's regular Link Impressions allocation system. The link module 102 tracks a variety of Webmaster specified data 310 such as User Traffic Targets for particular link exchange partners. If the Webmaster specified User Traffic Target is less than or equal to the User Traffic Target that the link module 102 determined for the link exchange partnership prior to considering the Webmaster specified User Traffic Target, the link module 102 allocates Link Impressions based on the Webmaster specified User Traffic Target prior to evenly distributing the Total Link Impressions across the link exchange partners of the Webmaster's web site. If the Webmaster specified User Traffic Target is greater than the User Traffic Target that the link module 102 determined for the link exchange partnership, than the link module 102 allocates Link Impressions based on the User Traffic Target that the link module 102 determined.

If both Webmasters for web sites in a link exchange partnership set Webmaster specified User Traffic Targets, then the link module 102 allocates Link Impressions based on the least User Traffic Target among the Webmaster specified User Traffic Targets and among the maximum User Traffic Targets that each web site can fulfill. For example, if web site A and web site B have established a link exchange partnership and the maximum amount of user traffic that web site A can send to web site B is one hundred (100) clicks and the maximum amount of user traffic that web site B can send to web site A is two hundred (200) clicks and the link module 102 determines that the User Traffic Target for the link exchange partnership is fifty (50) clicks, then if either Webmaster for web site A or web site B set a Webmaster specified User Traffic Target, then the link module 102 allocates Link Impressions based on the lesser of the Webmaster specified User Traffic Target and the fifty (50) clicks that the link module 102 determined. However, if both Webmasters for web site A and web site B set a Webmaster specified User Traffic Target, then the link module 102 allocates Link Impressions based on the least of the Webmaster specified User Traffic Targets, the one hundred (100) clicks that web site A can send at a maximum to web site B, and the two hundred (200) clicks that web site B can send at a maximum to web site A.

The link module 102 also tracks Webmaster specified data 310 that allows a Webmaster to set a link exchange partnership to only send user traffic from the Webmaster's web site to a link exchange partner's web site and not require the link exchange partner's web site to reciprocate the user traffic back. A Webmaster may be able to specify the Webmaster specified data 310 by navigating to the dashboard on the system web site 108 and inputting the data.

Figure 4:
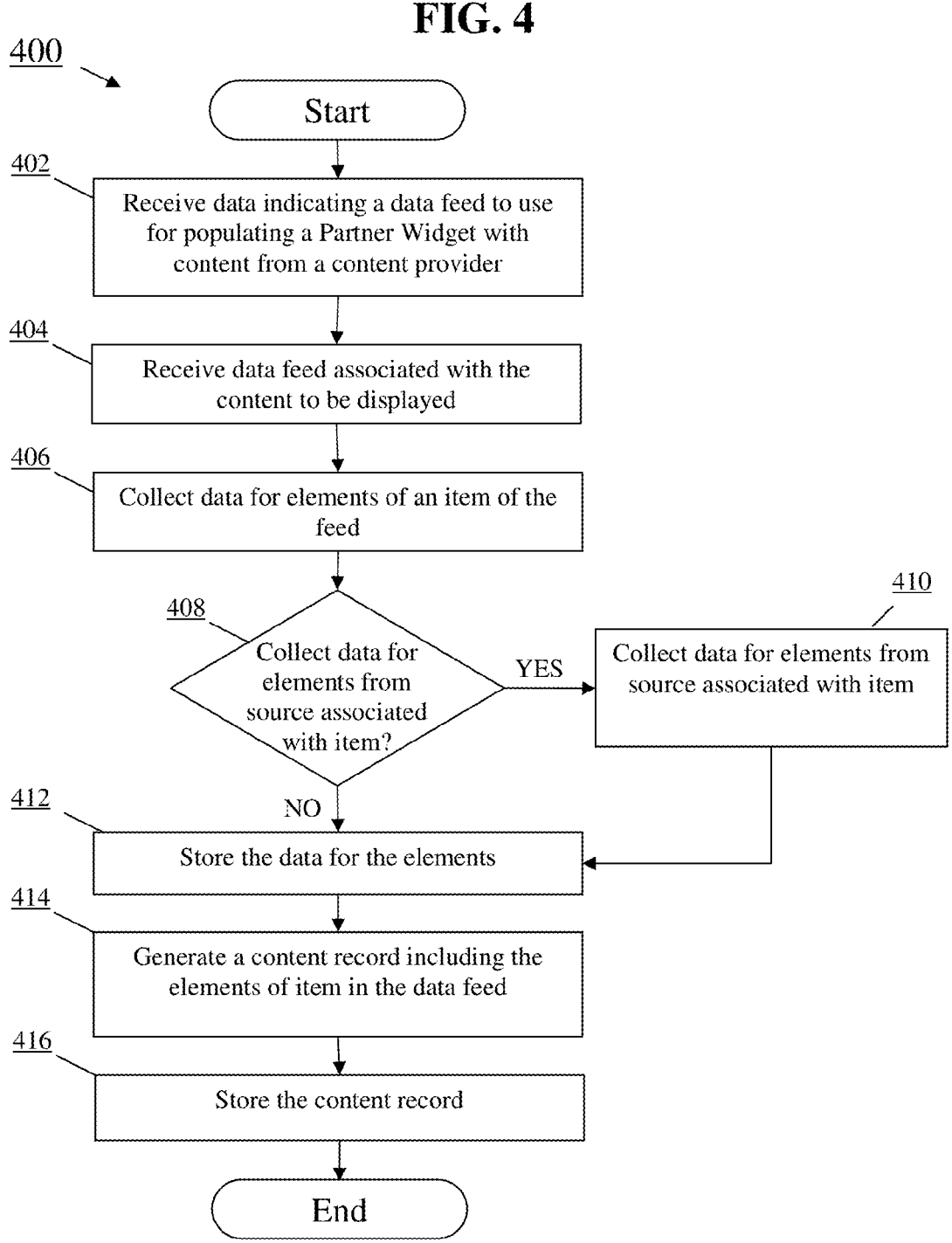
FIG. 4 is a flow diagram depicting a method for collecting data for use by link modules according to an embodiment of the present invention.

FIG. 4 is a flow diagram of a method 400 for collecting data for creating a Partner Widget according to an embodiment of the present invention. The method 400 may be performed by processing logic that may comprise hardware (circuitry, dedicated logic, etc.), software (such as is run on a general purpose computer system or a dedicated machine), or a combination of both. In some implementations, the method 400 is performed by the link module 102.

At block 402, the link module 102 receives data (e.g., partnership data) indicating which one or more web site data feeds 112 to use for creating Partner Widgets. The data can include a feed identifier (e.g., URL) of the feed or one or more item identifiers (e.g., URLs) of items that should be used to populate the Partner Widget.

At block 404, the link module 102 receives the web site data feed 112 associated with the content to be used to populate within one or more Partner Widgets. For example, the link module 102 can establish communication with the feed server of the web site data feed 112 and subscribe to the web site data feed 112. The link module 102 can store data from the received web site data feed 112 in a data store. The web site data feed 112 can be obtained using a push or pull method.

At block 406, the link module 102 collects data from the web site data feed 112. The link module 102 can parse the web site data feed 112 to identify an item and to identify elements of the item, and can extract the data pertaining to the elements. Examples of the elements of the item can include, and are not limited to, a title element, a link element, a description element, a body text element, URL, a keywords element, a media (e.g., image, audio, video) file element, a publish date element, an author element, a category element, a comments element, an identifier element, a source element, etc.

At block 408, the link module 102 determines whether to collect data for elements of an item from the data source (e.g., web page) that is associated with the item. If a web site data feed 112 has data for the elements of the item (block 408), the link module 102 stores the data for the elements at block 412. If a web site data feed 112 does not have data for one or more elements of the item (block 408), the link module 102 collects the data for the elements from the data source (e.g., web page) that corresponds to the item at block 410. The link module 102 can use a hyperlink, which corresponds to the link element for the item in the web site data feed 112, to obtain the data for an element in the data source.

For example, in the case of a music news article, the web site, The Rap Insider, may omit the thumbnail images from the web site data feed 112. The web site data feed 112 for "www.therapinsider.com/category/news/feed/" may not include a thumbnail image element for the item, and the link module 102 may use the hyperlink in the link element in the web site data feed 112 to obtain data (e.g., thumbnail image) for the thumbnail element from the underlying web page (e.g., www.therapinsider.com/2013/06/28/kid-literally-named-north-west-already-has-better-life-than-you-ever-will/) of the item. The link module 102 may retrieve data for an element from a data source (e.g., www.therapinsider.com/2013/06/28/kid-literally-named-north-west-already-has-better-life-than-you-ever-will/) using a web crawler or web spider capable of scraping and extracting content from a URL. The link module 102 can use any suitable protocol, such as Simple HTML DOM Parser, for a scraping operation.

At block 412, the link module 102 stores the data for the elements for the item in the data store. At block 414, the link module 102 generates a content record, which can include the data for the elements, for the web site data feed 112 item and stores the content record in the data store 110 at block 416. Examples of a content record can include, and are not limited to, a record in a file system, a record in a database, a text file, a database entry, etc. In one implementation, the content record is an XML-formatted plain text file. Each content record can be created, for example, by copying data for the elements of a corresponding item to a text file and storing the text file in the data store. The XML field elements of the content record can be mapped to the same field elements present in the item in the web site data feed 112. For example, the title, body text, and link (e.g., URL) fields of the content record may be copied from the corresponding element fields of the item in the web site data feed 112.

Method 400 or portions of method 400 can be iterative. The number of iterations can be based on the number of times the same web site data feed 112 or a different web site data feed 112 is received. For example, an updated version of a web site data feed 112, which may include a new item, can be received at block 404, after receiving a previous version of the web site data feed 112. The link module 102 can identify a new item in the updated web site data feed 112 that was not present in the previous web site data feed 112 and can collect data, in the updated web site data feed 112, for elements of the new item at block 406. The link module 102 may collect data for elements from the source (e.g., web page) of the new item at block 410. At block 412, the link module 102 can store the data and can generate a new content record for the new item at block 414. The content record can include the data for the elements of the new item.

Figure 5:
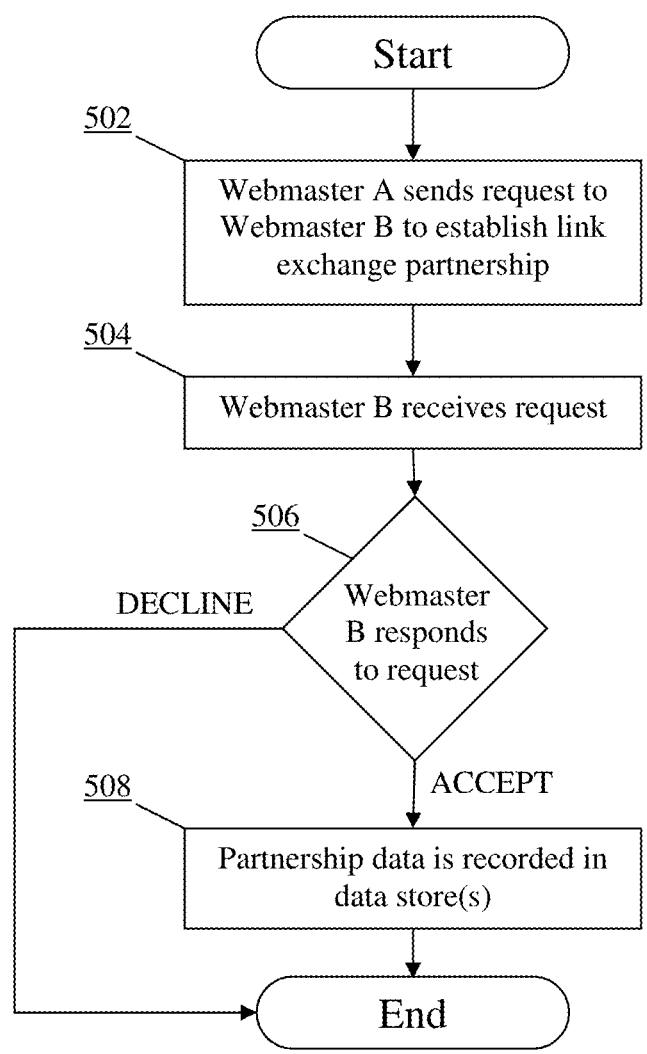
FIG. 5 is a flow diagram depicting a Webmaster establishing a link exchange partnership with another Webmaster according to an embodiment of the present invention.

FIG. 5 is a flow diagram depicting a Webmaster establishing a link exchange partnership with another Webmaster according to an embodiment of the present invention. The method 500 may be performed through the actions by each Webmaster and by processing logic that may comprise hardware, software, or a combination of both.

At block 502, the Webmaster sends a request to another Webmaster to establish a link exchange partnership. For example, when the Webmaster for web site A wants to establish a link exchange partnership with web site B, the Webmaster for web site A navigates to web site B's profile page on the system web site 108 and clicks a button, which may be labeled "Add Partner", that indicates that the Webmaster would like to establish a link exchange partnership. The system web site 108 then notifies the link module 102 that the partnership request has been sent.

At block 504, the Webmaster who has received the request to establish a link exchange partnership is notified that the request has been made. The request can be received from the system web site 108 and from an email that is sent by the link module 102 to the Webmaster who has received the request.

At block 506, the Webmaster who has received the request may respond to the request to establish a link exchange partnership. If the Webmaster elects to accept the request, a link exchange partnership will be established and the partnership data will be recorded in the data store 110 at block 508. For example, when Webmaster B receives the request to establish a link exchange partnership from Webmaster A on the system web site 108, the request may include two buttons, "Accept" and "Decline". If Webmaster B clicks "Accept", that indicates that Webmaster B has accepted the request from Webmaster A to establish a link exchange partnership and if Webmaster B clicks "Decline", that indicates that Webmaster B has declined the request from Webmaster B to establish a link exchange partnership. If Webmaster B declines the request from Webmaster A to establish a link exchange partnership, then Webmaster A may be notified. Once a link exchange partnership is established, it will continue until either Webmaster A or Webmaster B chooses to end the partnership, which the Webmaster can indicate by navigating to the profile page of the other Webmaster's web site on the system web site 108 and clicking a button, which may be labeled "End Partnership".

At block 508, the partnership data 254 is recorded in the data store 110 for the link exchange partnership that has been established between the Webmasters. The partnership data 254 can include, for example, and not limited to, the default feed identifiers for each of the Webmasters' web sites, as well as the date and time that the link exchange partnership was established.

Figure 6:
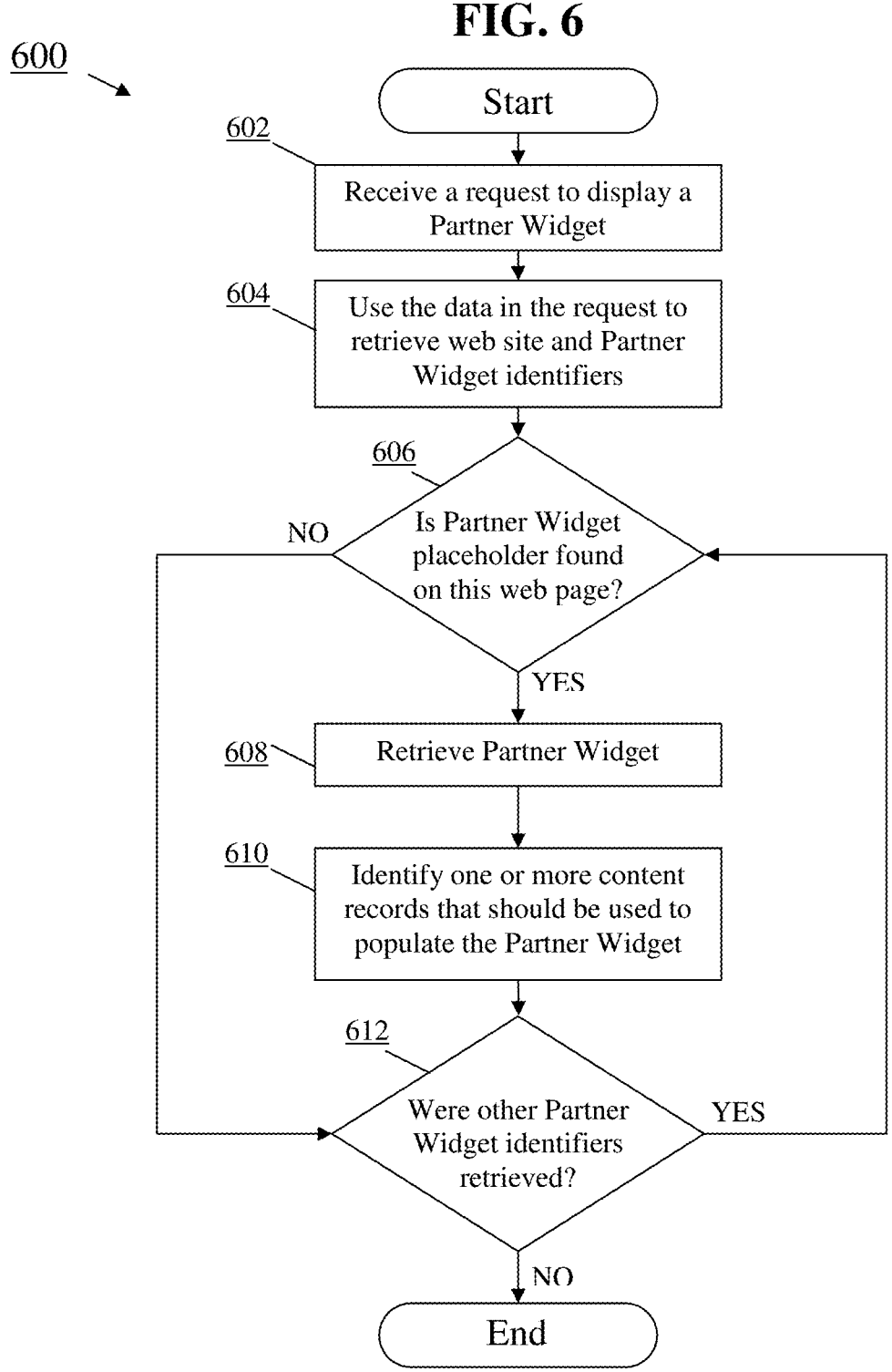
FIG. 6 is a flow diagram depicting one or more Partner Widgets being requested and delivered on a Webmaster's web site according to an embodiment of the present invention.

FIG. 6 is a flow diagram of an implementation for a method 600 for serving one or more Partner Widgets according to an embodiment of the present invention. The method 600 may be performed by processing logic that may comprise hardware, software, or a combination of both.

At block 602, the link module 102 receives a request to serve one or more Partner Widgets. The request can be received from a browser or a mobile application on a user device. A request can be triggered by, for example, and not limited to, a web page view, a web page load, a mobile application data load, etc. For example, when a user accesses a pre-configured web site, the web page load may trigger a request for one or more Partner Widgets to be sent to the link module 102.

Web pages, mobile applications, messages (e.g., email, text, social media messages, etc.), and newsletters can be pre-configured to send requests for Partner Widgets to the link module 102. The request can include, for example, and not limited to, a web site identifier. At block 604, the link module 102 can use the web site identifier to identify one or more Partner Widget identifiers that may appear on the web site.

For example, a user may request a page view of www.therapinsider.com on a user device. The browser on the user device may receive a web page for www.therapinsider.com from a web application server. The www.therapinsider.com web page may have instructions and an identifier for the web site. When the browser loads the web page, the instructions can retrieve one or more Partner Widget identifiers from the system and cause the browser to search for Partner Widget placeholders on the web page that may correspond to the Partner Widget identifiers retrieved in the request. A Partner Widget placeholder may include a tag within a Webmaster's web site that contains the Partner Widget identifier that indicates where a Partner Widget should be displayed when a user requests a page view of the web site.

At block 606, the link module 102 determines whether a Partner Widget placeholder that corresponds to one of the Partner Widget identifiers that was retrieved is found on the web page. If a Partner Widget placeholder that corresponds to the Partner Widget identifier is found on the web page, the link module 102 identifies the Partner Widget that should be populated at the location of the Partner Widget placeholder at block 608.

At block 610, the link module 102 identifies one or more content records that should be used to populate the Partner Widget. The link module 102 can use the widget data 262, web site data 252, and partnership data 254 to identify the content records 256 that should be used to populate the widget template 260. For example, the widget data 262 may indicate that the Partner Widget for web site A will display three (3) links to content all from a single link exchange partner. The web site data 252 may then indicate that web site A has one thousand (1,000) Total Estimated Link Impressions and the partnership data 254 may indicate that web site A will allocate two hundred (200) Link Impressions to web site B, three hundred (300) Link Impressions to web site C, and five hundred (500) Link Impressions to web site D.

The link module 102 then randomly selects one of web site A's link exchange partners after assigning a weighting of twenty percent (20%), thirty percent (30%), and fifty percent (50%) to web sites B, C, and D, respectively. Once the link module has selected a link exchange partner, the link module 102 identifies three (3) content records 256 from that link exchange partner. If the partnership data indicates that web site A's Webmaster has selected content from the link exchange partner to be displayed in the Partner Widgets on web site A, then that content is displayed. Otherwise, the link module 102 may select the content from the link exchange partner to populate web site A's Partner Widget using the data in the request and user data (e.g., user preferences, user browser history, user application usage data, gender, age, geographic location, etc.) to identify which content records in the data store 110 to use.

In one implementation, at block 610, the link module 102 populates the Partner Widget using the identified data (e.g., Webmaster specified data 310, content record data) to generate the Partner Widget and sends the Partner Widget to the user device. A browser or mobile application can present the Partner Widget on the user device. For example, the link module 102 may populate web site A's Partner Widget with the data for the title element and the link element in the content record 256 for an item in web site B's web site data feed 112 to generate the Partner Widget and may send the Partner Widget to a browser on the user device. The browser can load a requested web page with the received Partner Widget. The user may select (e.g., click) the link within the Partner Widget for web site B's content in web site A and be directed to the digital content that is associated with the link. For example, the user may be redirected to web site B.

In another implementation, at block 610, the link module 102 provides the data (e.g., Webmaster specified data 310, content record data) to a browser or a mobile application on the user device, and the browser or mobile application renders the Partner Widget on the user device using the data.

At block 612, the link module 102 determines whether there are other Partner Widget identifiers that were retrieved in the request that the browser has not yet searched for. If there are Partner Widget identifiers that were retrieved in the request that the browser has not yet searched for, the link module 102 identifies the Partner Widget identifier and determines if a Partner Widget placeholder that corresponds to the Partner Widget identifier is found on the web page at block 606.

FIGS. 7-10 depict examples of graphical user interfaces generated by the link module 102 on the system web site 108 for administration of and monitoring of performance of link exchange partnerships.

Figure 7:
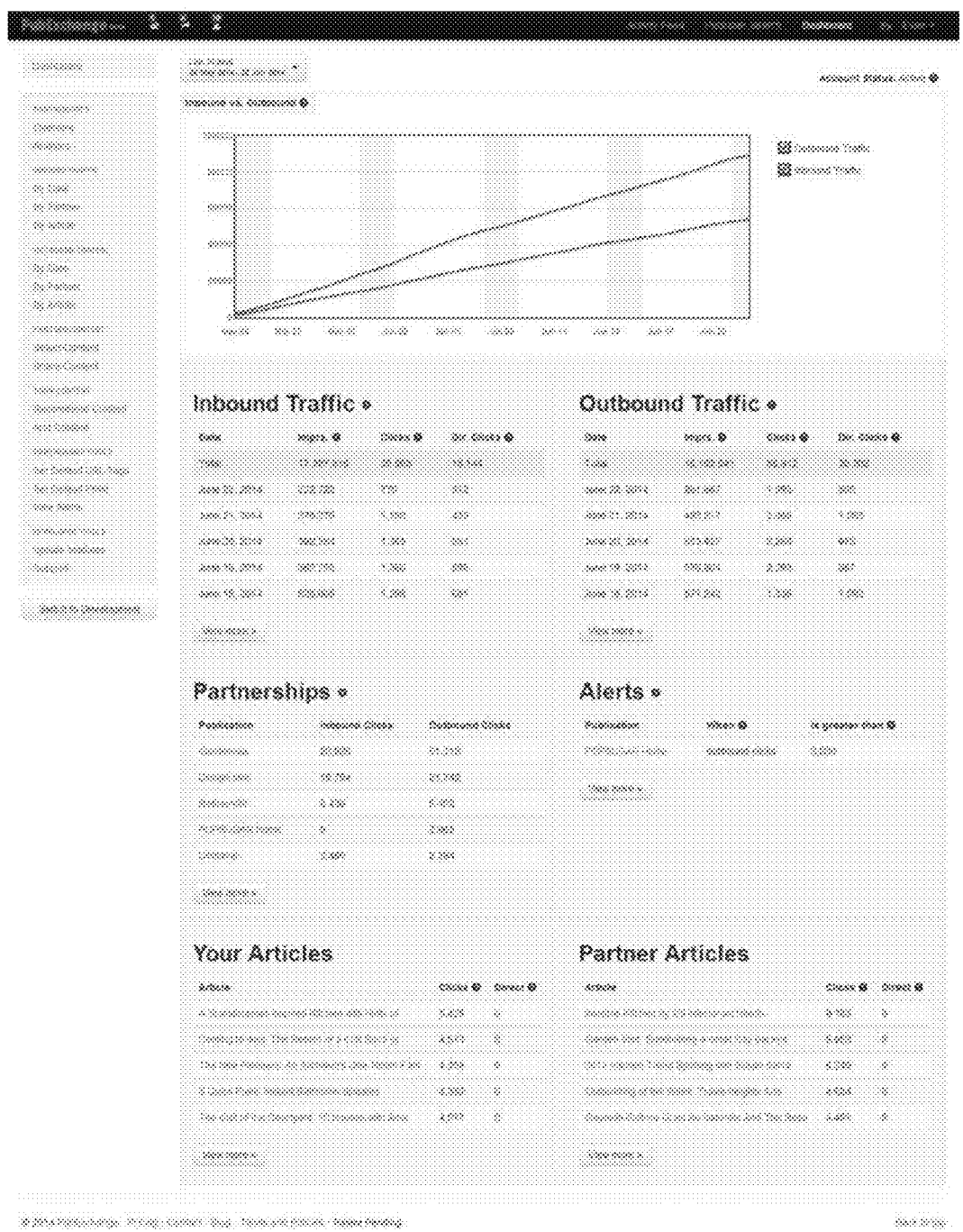
FIGS. 7-10 depict examples of graphical user interfaces for administration of and monitoring of performance of link exchange partnerships.

More specifically, FIG. 7 is a graphical user interface identifying a variety of metrics for a number of link exchange partnerships for a particular web site.

Figure 8:
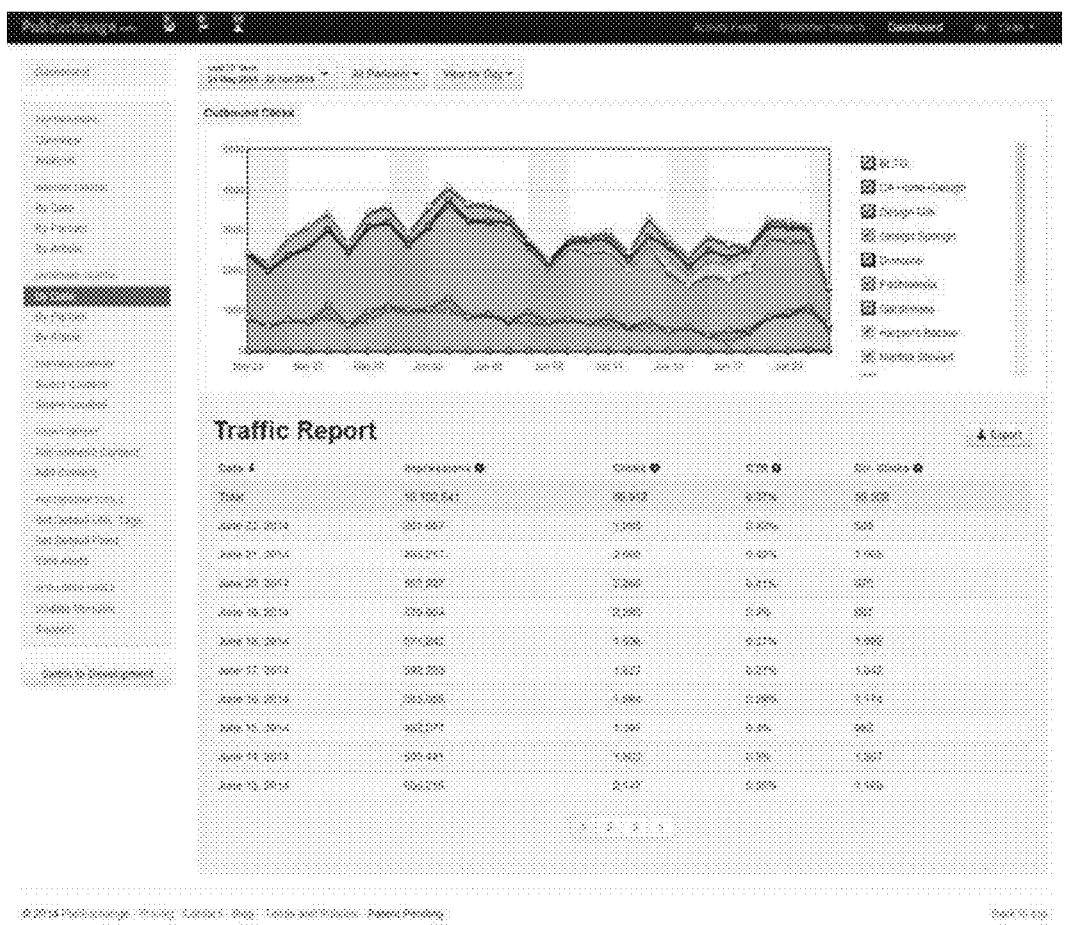

FIG. 8 is a graphical user interface identifying metrics for a number of link exchange partnerships for a particular web site on a clicks basis.

Figure 9:
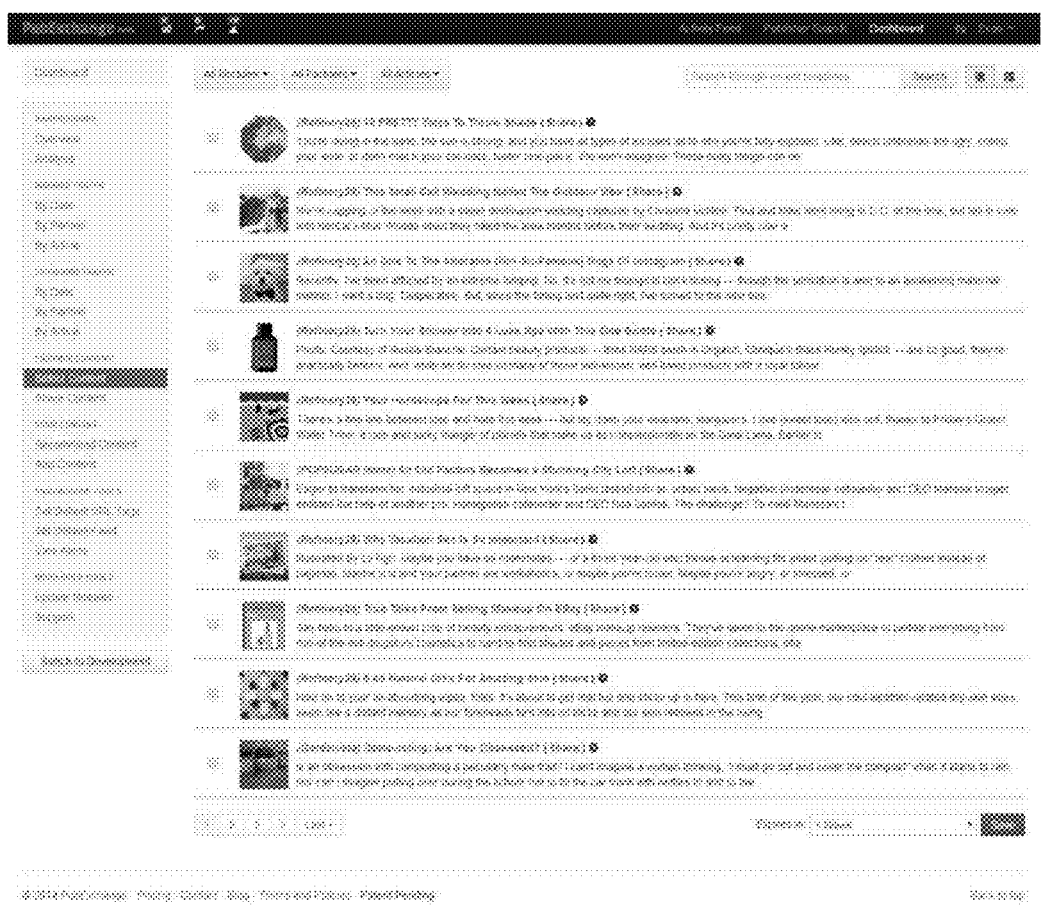

FIG. 9 is a graphical user interface for selecting content to be displayed within a Partner Widget on a Webmaster's web site from a number of link exchange partners.

Figure 10:
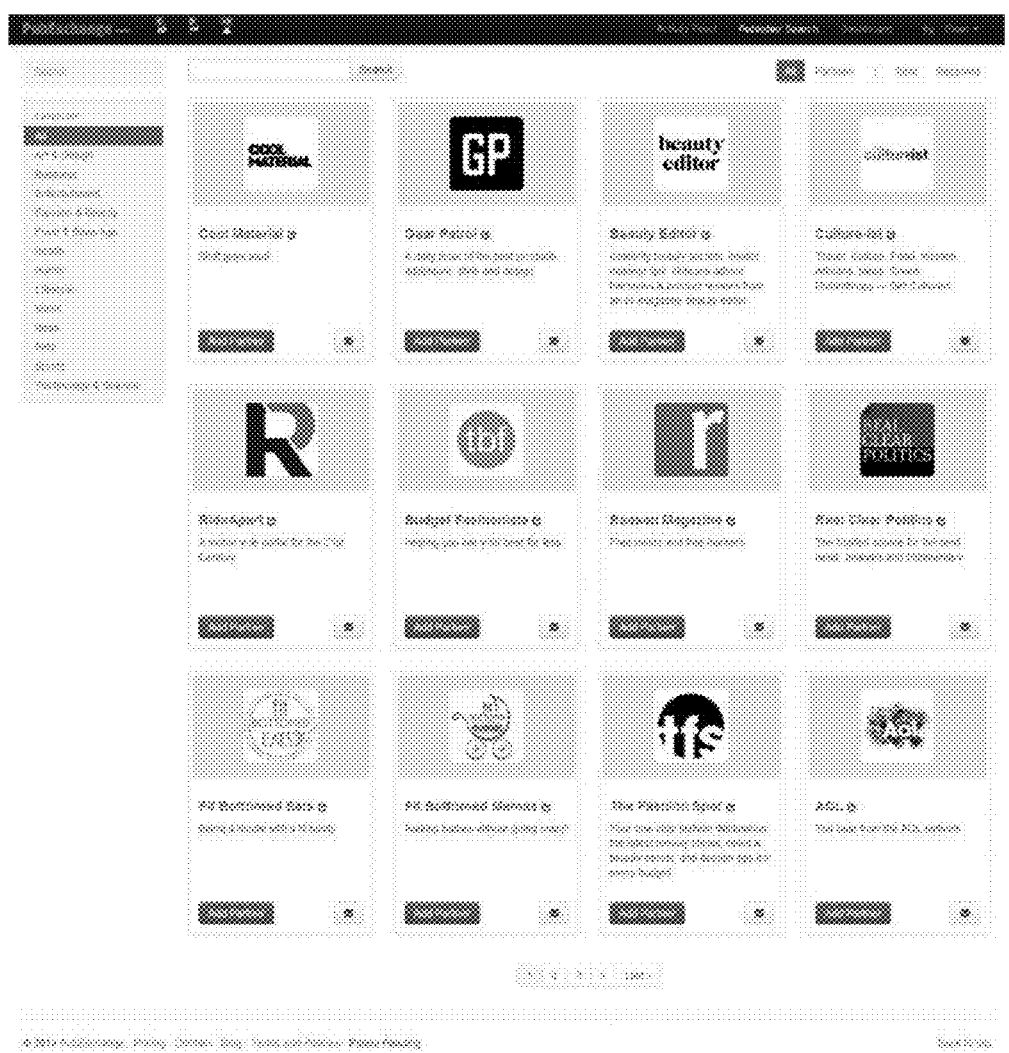

FIG. 10 is a graphical user interface for requesting new link exchange partnerships and managing existing link exchange partnerships for web sites participating in the link exchange management system.

Figure 12:

FIGS. 11-12 depict examples of Partner Widgets.

Specifically, FIG. 11 is a Partner Widget that contains links from multiple link exchange partners.

FIG. 12 is a Partner Widget that contains links from a single link exchange partner.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A system for facilitating the exchange of user traffic between web sites comprising:
   a data store;
   one or more servers; and
   a link module, hosted on the one or more servers, comprising:
   a web site subsystem for receiving web site data and storing web site data in the data store;
   a partnership subsystem for receiving partnership data and storing partnership data in the data store;
   wherein the link module is configured to:
   estimate a total number of links that a web site of a first webmaster will display within a partner widget over a given time period ("Total Estimated Link Impressions"),
   determine a percentage of Total Estimated Link Impressions of the web site of the first webmaster to allocate to links to content of a second webmaster to facilitate an approximately equal exchange of user traffic between the web site of the first webmaster and the website of the second webmaster from among other link exchange partners of the first webmaster based on accounting data and webmaster specified data,
   iteratively determine the percentage of Total Estimated Link Impressions of the web site of the first webmaster to allocate to links to content of other link exchange partners of the first webmaster to facilitate approximately equal exchanges of user traffic between the web site of the first webmaster and the web sites of the other link exchange partners of the first webmaster based on performance data, and
   generate partner widgets using the website data and the partnership data.

2. The system of claim 1, wherein the link module further comprises a data collector subsystem for retrieving additional information corresponding to received web site data and storing the additional information in the data store.

3. The system of claim 1, wherein the link module further comprises a user traffic reporting subsystem for reporting user traffic information.

4. The system of claim 1, wherein the link module further comprises a widget creation subsystem for generating a partner widget template using the web site data and partnership data and storing the partner widget template in the data store.

5. The system of claim 1, wherein the web site data further comprises at least one of the group consisting of a web site identifier, a partner widget identifier, a logo and a web site description.

6. The system of claim 1, wherein the partnership data further comprises at least one of the group consisting of a feed identifier, a content record identifier and a user traffic target.

7. The system of claim 1, wherein the link module tracks and stores performance data comprising at least one of the group consisting of: a number of times links to content of a link exchange partner have been displayed in a partner widget, a number of times that a user has clicked on a link from within a partner widget and a number of times that a user has clicked on a link from within a partner widget relative to the number of times that the link has been displayed in a partner widget; and wherein the link module further uses the performance data to determine the percentage of Total Estimated Link Impressions of the web site of the first webmaster to allocate to links to content of a link exchange partner.

8. The system of claim 1, wherein the link module: tracks and stores accounting data; receives and stores webmaster specified data; and wherein the link module further uses the accounting data and webmaster specified data to determine the percentage of Total Estimated Link Impressions of the web site of the first webmaster to allocate to links to content of a link exchange partner and to generate partner widgets.

9. A method for exchanging user traffic between web sites comprising the steps of:
receiving partnership data indicating one or more web site data feeds for creating partner widgets;
receiving web site data from the one or more web site data feeds;
estimating a total number of links that a web site of a first webmaster will display within a partner widget over a given time period ("Total Estimated Link Impressions");
determining a percentage of Total Estimated Link Impressions of the web site of the first webmaster to allocate to links to content of a second webmaster to facilitate an approximately equal exchange of user traffic between the web site of the first webmaster and the web site of the second webmaster from among other link exchange partners of the first webmaster based on accounting data and webmaster specified data;
iteratively determining the percentage of Total Estimated Link Impressions of the web site of the first webmaster to allocate to links to content of other link exchange partners of the first webmaster to facilitate approximately equal exchanges of user traffic between the web site of the first webmaster and the web sites of the other link exchange partners of the first webmaster based on performance data; and
generating partner widgets using the partnership data and web site data.

10. The method of claim 9, wherein the web site data further comprises at least one of the group consisting of a web site identifier, a partner widget identifier, a logo and a web site description.

11. The method of claim 10, wherein the partnership data further comprises at least one of the group consisting of a feed identifier, a content record identifier and a user traffic target.

12. The method of claim 9, further comprising tracking performance data and using the performance data in determining the percentage of Total Estimated Link Impressions of the web site of the first webmaster to allocate to links to content of a link exchange partner and in generating a partner widget.

13. The method of claim 12, further comprising receiving accounting data and using the accounting data in determining the percentage of Total Estimated Link Impressions of the web site of the first webmaster to allocate to links to content of a link exchange partner and in generating a partner widget.

14. The method of claim 13, further comprising receiving webmaster specified data and using the webmaster specified data to generate a partner widget.

* * * * *